United States Patent [19]

Matsukawa et al.

[11] Patent Number: 5,770,653

[45] Date of Patent: Jun. 23, 1998

[54] RESIN COMPOSITION AND MANUFACTURING METHOD THEREOF

[75] Inventors: Kenji Matsukawa; Toshio Hayashiya, both of Osaka; Daisaku Yamamoto, Suita, all of Japan

[73] Assignee: Nippon Shokubai Co., Ltd., Osaka, Japan

[21] Appl. No.: 692,263

[22] Filed: Aug. 5, 1996

[30] Foreign Application Priority Data

| | | | |
|---|---|---|---|
| Aug. 17, 1995 | [JP] | Japan | 7-209590 |
| Jul. 3, 1996 | [JP] | Japan | 8-173957 |

[51] Int. Cl.[6] .............................. C08F 8/00; C08L 67/00
[52] U.S. Cl. ........................... 525/168; 528/272; 525/10; 525/14; 525/16; 525/17; 525/41; 525/43; 525/44; 525/168; 525/445; 524/82; 524/86; 524/115
[58] Field of Search ............................. 528/272; 525/10, 525/14, 16, 17, 41, 43, 44, 168, 445; 524/82, 86, 115

[56] References Cited

U.S. PATENT DOCUMENTS

| | | | |
|---|---|---|---|
| 3,683,045 | 8/1972 | Baldwin | 260/837 |
| 4,325,841 | 4/1982 | Howell | 252/431 |
| 4,336,359 | 6/1982 | Messick | 525/531 |
| 4,522,978 | 6/1985 | Gardner | 525/48 |
| 4,626,570 | 12/1986 | Gardner | 525/12 |
| 4,684,695 | 8/1987 | Oshima et al. | 525/36 |
| 4,777,208 | 10/1988 | Hefner, Jr. | 524/855 |
| 4,925,904 | 5/1990 | Schmidt | 526/205 |

FOREIGN PATENT DOCUMENTS

| | | |
|---|---|---|
| 0 275 034 A2 | 7/1988 | European Pat. Off. . |
| 0 275 034 A3 | 7/1988 | European Pat. Off. . |
| 0 306 444 A1 | 3/1989 | European Pat. Off. . |
| 2 301 407 A | 7/1974 | Germany . |
| 24 54 773 A | 5/1976 | Germany . |
| 44-19391 | 8/1969 | Japan . |
| 48-13484 A | 2/1973 | Japan . |
| 49-10987 A | 1/1974 | Japan . |
| 51-37148 A | 3/1976 | Japan . |
| 51-55393 A | 5/1976 | Japan . |
| 51-65163 A | 6/1976 | Japan . |
| 51-129482 A | 11/1976 | Japan . |
| 56-50910 A | 5/1981 | Japan . |
| 57-164112 A | 10/1982 | Japan . |
| 63-182370 A | 7/1988 | Japan . |
| 4-309557 A | 11/1992 | Japan . |
| 1 446 673 | 8/1976 | United Kingdom . |
| 1 519 523 | 8/1978 | United Kingdom . |

OTHER PUBLICATIONS

Derwent Publications Ltd. AN 81–46527d XP002019677. 1981.

Derwent Publications Ltd. AN 92–412082 XP002019678, 1992.

Nelson, D.L., "Considerations: Dicyclopentadiene in Polyester Resins" The Society of the *Plastics Industry, Inc.* 36th Annual Conf. Reinfor. Plastics/Comp. Inst., The Society of the Plastics Industry, Inc., Feb. 16–20, 1981, pp. 1–7.

*Primary Examiner*—Samuel A. Acquah
*Attorney, Agent, or Firm*—Kubovcik & Kubovcik

[57] ABSTRACT

A resin composition includes a dicyclopentenyl-group containing unsaturated polyester resin, a phenothiazine derivative (a) and an anion producing compound (b). On the other hand, resin composition includes a thermosetting resin, a phenothiazine derivative (a), an anion producing compound (b) and a phosphorous ester (c). A manufacturing method of resin composition includes the step of obtaining a dicyclopentenyl-group-containing unsaturated polyester by polycondensing unsaturated polyester material including a compound having a dicyclopentenyl group, and the step of mixing a cross-linking monomer with the obtained dicyclopentenyl-group-containing unsaturated polyester, wherein the phenothiazine (a) and the anion producing compound (b) are added in at least one of those steps. This provides the resin composition which produces no gel during storage and has very little gel time drift and viscosity drift, and moreover which produces a cured product of good hue, water resistance and surface drying characteristics, and further provides the manufacturing method of such resin composition.

22 Claims, No Drawings

RESIN COMPOSITION AND MANUFACTURING METHOD THEREOF

FIELD OF THE INVENTION

The present invention relates to thermosetting resin composition and a manufacturing method thereof, and more particularly to a radical-setting-type thermosetting resin composition which produces no gel, has very little gel time and viscosity drifts during storage, and which produces a cured product of good characteristics in hue, water resistance and surface drying, and to a manufacturing method thereof.

BACKGROUND OF THE INVENTION

A radical-setting-type thermosetting resin, such as an unsaturated polyester resin, vinylester (epoxy(meth) acrylate) resin, urethane(meth)acrylate resin and polyester (meth)acrylate resin, is relatively easy to handle because it is liquid. Moreover, the radical-setting-type thermosetting resin is quick to harden and is a typical thermosetting resin for forming a molded product which has good characteristics in mechanical strength and water resistance. Therefore, the radical-setting-type thermosetting resin has been widely used, for example, for coating and adhesive applications, and as fiber reinforced plastics (FRP) materials.

It is well known that a small amount of a polymerization inhibitor is added to the radical-setting-type thermosetting resin for steady manufacture thereof, or for preservation of obtained resins in good conditions over a long period of time. For example, a polymerization inhibitor composed of a quinone compound, such as hydroquinone and phenol (hereinafter, will be referred to as a quinone-type inhibitor) is usually used in order to prevent gelation of the radical-setting-type thermosetting resin during manufacture, and in order to adjust the obtained radical-setting-type thermosetting resin so that it has a desirable pot life.

Nevertheless, it is very common that the radical-setting-type thermosetting resin to which only the quinone-type inhibitor is added gradually increases viscosity during storage, and finally gels, losing commercial value as a resin product within a short period of time. Particularly, in an unsaturated polyester resin coating material, FRP molding material and the like of a room temperature setting type, a metallic curing accelerator, such as cobalt, manganese, tin, vanadium, and copper, which shows a redox action (hereinafter, will be referred to as a redox accelerator) is mixed in most cases with the resin product in advance, and therefore it is difficult to obtain enough stability during storage. Moreover, the action of the redox accelerator greatly affects a resin with a certain unsaturated bond introduced into the resin structure thereof (generally called an air-setting-type unsaturated polyester resin) such as, a resin with a dicyclopentenyl group or allyl group in the resin structure thereof. Therefore, there occurs a serious problem of a large amount of gel being often produced at the contact surface between the resin and the air in, for example, a resin storage container and storage tank. Therefore, improvement on stability of the resin composition during storage is strongly demanded in this industry.

The problem is solved if more quinone-type inhibitor is added. Nonetheless, as disclosed in Japanese Laid-Open Patent Application No. 50910/1981 (Tokukaishou 56-50910), adding more quinone-type inhibitor has adverse effects: the hardening characteristics of the resin composition deteriorate significantly, and therefore the complete hardening takes a very long time. This results in a poorer work efficiency and productivity.

Therefore, methods of adding various kinds of polymerization inhibitors are suggested so as to develop a resin composition which can be stored stably over a long period of time without damaging the hardening characteristics of the radical-setting-type thermosetting resin. For example, Japanese Laid-Open Patent Application No. 129482/1976 (Tokukaishou 51-129482) and Japanese Laid-Open Patent Application No. 182370/1988 (Tokukaishou 63-182370) disclose a method of adding an organic phosphorus compound, such as triphenylphosphine and triphenylphosphite; Japanese Laid-Open Patent Application No. 13484/1973 (Tokukaishou 48-13484), Japanese Laid-Open Patent Application No. 50910/1981 (Tokukaishou 56-50910) and Japanese Laid-Open Patent Application No. 55393/1976 (Tokukaishou 51-55393) disclose a method of adding only an amine, such as nitrosohydroxylamine, benzyldimethylamine and a radical-polymerizable-group-containing amine, or of adding such an amine along with the quinone-type inhibitor as a polymerization inhibitor; and Japanese Laid-Open Patent Application No. 10987/1974 (Tokukaishou 49-10987) and U.S. Pat. No. 4,923,904 (Japanese Laid-Open Patent Application No. 70552/1989 (Tokukaishou 64-70552)) disclose a method of adding only phenothiazine or of adding phenothiazine along with the quinone-type inhibitor as a polymerization inhibitor. In addition to these methods, a method of adding only an oxime or of adding an oxime along with the quinone-type inhibitor as a polymerization inhibitor is also disclosed.

Moreover, Japanese Laid-Open Patent Application No. 309557/1992 (Tokukaihei 4-309557) discloses a method of adding an organic phosphorous ester and N-nitrosophenylhydroxylamine aluminum salt as a polymerization inhibitor, which is particularly effective to a dicyclopentenyl-group-containing unsaturated polyester resin.

Nevertheless, in most cases, in order to suppress viscosity increase of the resin during storage, these compounds need to be added in a large amount. As a result, it takes a long time for a surface of the resin composition to harden, i.e., the surface of the cured product of the resin remains sticky for a long time. Especially, since a vinylester resin and urethane (meth)acrylate resin have an anaerobic (meth)acryloyl group as a polymerizable functional group, the polymerization inhibitor used in a large amount makes the sticky surface even stickier, thereby causing such a resin to be not suitable for industrial applications, such as FRP molding and coating material of room temperature curing.

Moreover, it is well know that the longer the radical-setting-type thermosetting resin (including the above-mentioned polymerization inhibitor) is stored after production, the longer it takes in gelation (the characteristics are easy to change over a period of time). This is an undesirable, adverse result from adding a large amount of polymerization inhibitor, and is an unavoidable, fatal defect with the polymerization inhibitor used to ensure stability of the resin during storage. Therefore, when the resin is used, the gel time should be readjusted by, for example, increasing the amount of a curing agent and/or curing accelerator, so as to provide an appropriate gel time for work conditions. Adjusting the gel time is not only troublesome when the resin is used, but adding a great amount of a curing agent and/or curing accelerator also causes serious adverse effects, such as deterioration of characteristics and more evident coloring with a molded product.

Especially, as disclosed in Japanese Laid-Open Patent Application No. 65163/1976 (Tokukaishou 51-65163), an oxime tends to cause the above-mentioned defects to occur.

Therefore, it is natural that prevention of gel time drift is strongly demanded for better quality control in production and for higher work performance at molding processing sites.

Rare examples of attempts to prevent gelation of the resin during storage and stabilize good hardening characteristics of the resin over a long period of time (i.e., produces little gel time drift) include Japanese Laid-Open Patent Application No. 37148/1976 (Tokukaishou 51-37148) using a hydroxylamine as a polymerization inhibitor, U.S. Pat. No. 4,325,841 (Japanese Laid-Open Patent Application No. 20012/1981 (Tokukaishou 56-20012)) using a salt-like reaction product of an amine and a carboxylic acid as a polymerization inhibitor, and Japanese Laid-Open Patent Application No. 164112/1982 (Tokukaishou 57-164112) using an N-oxyalkyl-substituted aniline as a polymerization inhibitor. Nevertheless, the methods disclosed in these prior arts cannot solve the problems of deterioration of hue and water resistance, and have a defect in limited applications of the radical-setting-type thermosetting resin, due to adding a large amount of polymerization inhibitor. Therefore, the problems for applications are yet to be solved.

In the radical-setting-type thermosetting resin, it is absolutely necessary to prevent gelation and viscosity increase during storage and maintain the good hardening characteristics over a long period of time.

Nonetheless, when only the conventionally known quinone-type inhibitor is added as a polymerization inhibitor, it is impossible to achieve the object without adding a large amount of the quinone-type inhibitor, which in turn causes the loss of the resin hardening characteristics. Moreover, when only an organic phosphorus compound, amine compound, phenothiazine, or oxime is added, those problems can be solved, but only with an adverse effect of gel time drift of the resin composition. Therefore this is not suitable for a practical use, and may also cause deterioration of hue and water resistance of the cured product to occur, and the cured product to be sticky. These various problems have not yet satisfactorily been solved so far.

SUMMARY OF THE INVENTION

In order to overcome the defects of the conventional resin composition, a first object of the present invention is to provide a dicyclopentenyl-group- containing unsaturated polyester resin composition, which has good viscosity stability and little gel time drift during storage, and which produces a cured product of good hue, water resistance and surface drying characteristics.

In order to overcome the defects of the conventional resin composition, a second object of the present invention is to provide a resin composition which has good viscosity stability and little gel time drift during storage, and moreover, which produces a cured product of good hue, water resistance and surface drying characteristics.

Furthermore, a third object of the present invention is to provide a method of manufacturing a resin composition which has good viscosity stability during storage and little gel time drift, and moreover, which produces a cured product of good hue, water resistance and surface drying characteristics.

The inventors of the present invention had been working in order to provide a resin composition which accomplishes the first object. As a result, it was found that the object could be accomplished by a resin composition obtained by mixing a combination of a plurality of specific compounds with the dicyclopentenyl-group-containing unsaturated polyester resin. Moreover, the inventors found an extremely effective additive system for accomplishing the second object, which lead to the completion of the present invention.

Specifically, in order to accomplish the first object, the resin composition in accordance with the present invention is characterized in that it includes: a dicyclopentenyl-group-containing unsaturated polyester whose content ratio of dicyclopentenyl groups is not less than 20 percent by weight; a cross-linking monomer; and a curing accelerator, wherein storable time measured with an anti-skinning stability test at 60° C. is not shorter than 8 days, and gel time at room temperature measured for a mixture of 0.55 parts by weight of the methylethylketone peroxide per 100 parts by weight of the resin composition is not longer than 60 minutes.

According to the above-mentioned first composition, it is possible to provide the dicyclopentenyl-group-containing unsaturated polyester resin composition, which has good storage stability and hardening characteristics, and moreover, which produces the cured product of good physical properties such as gloss, water resistance and strength.

Furthermore, in order to accomplish the first object, the resin composition in accordance with the present invention is characterized in that it includes: a dicyclopentenyl-group-containing unsaturated polyester resin; a phenothiazine (a); and an anion producing compound (b).

According to the above-mentioned second composition, it is possible to provide the dicyclopentenyl-group-containing unsaturated polyester resin composition, which has good storage stability and little gel time drift, and moreover, which produces a cured product of good surface drying, water resistance and hue.

In the above-mentioned second composition, the dicyclopentenyl-group-containing unsaturated polyester resin is preferably composed of: the dicyclopentenyl-group-containing unsaturated polyester whose content ratio of dicyclopentenyl groups is not less than 20 percent by weight; and a cross-linking monomer. This enables the dicyclopentenyl-group-containing unsaturated polyester resin composition to produce a cured product of even better physical properties such as gloss, water resistance and strength.

Furthermore, in order to accomplish the above-mentioned second object, the resin composition in accordance with the present invention is characterized in that it includes: a thermosetting resin; a phenothiazine (a); an anion producing compound (b); and a phosphorous ester (c).

According to the above-mentioned third composition, it is possible to provide the resin composition which has good storage stability and little gel time drift, and moreover, which produces a cured product of good surface drying, water resistance and hue.

Furthermore, in the above-mentioned second and third compositions, the anion producing compound (b) is preferably at least one compound selected from the group consisting of ammonium salt, phosphonium salt, sulfonium salt and metal halide. This further improves the storage stability of the resin composition.

Moreover, in order to accomplish the above-mentioned third object, the method of manufacturing the resin composition in accordance with the present invention is characterized in that it includes the steps of: (1) obtaining a dicyclopentenyl-group-containing unsaturated polyester by polycondensing unsaturated polyester material including a compound having a dicyclopentenyl group; and (2) mixing a cross-linking monomer with the obtained dicyclopentenylgroup-containing unsaturated polyester, wherein at least one of the steps selected from the group consisting of the step of polycondensing the unsaturated polyester material and the step of mixing the cross-linking monomer includes a step of adding a phenothiazine (a) and an anion producing compound (b).

According to the above method, it is possible to manufacture the dicyclopentenyl-group-containing unsaturated polyester resin composition, which has good storage stability and little gel time drift and moreover, which provides a cured product of good surface drying, water resistance and hue.

For a fuller understanding of the nature and advantages of the invention, reference should be made to the ensuing detailed description taken in conjunction with the accompanying drawings.

DESCRIPTION OF THE EMBODIMENTS

The following description will discuss the present invention in detail. Note that in the present invention, substituents represented by the structural formulas

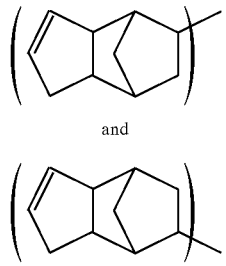

and will be inclusively referred to as dicyclopentenyl groups.

Thermosetting resins used in the present invention are of radical setting types which are cured with radical polymerization. Examples of the radical-setting-type thermosetting resins include an unsaturated polyester resin, vinylester resin (epoxy(meth)acrylate resin), urethane (meth) acrylate resin, and polyester (meth) acrylate resin. The radical-setting-type thermosetting resin is usually constituted of an appropriate amount of a cross-linking monomer and a resin solid composed of a polymer, such as an unsaturated polyester, epoxy(meth)acrylate, urethane(meth)acrylate, and polyester (meth)acrylate.

The unsaturated polyester in the present invention is a polymer obtained by polycondensing an acid component essentially containing unsaturated polybasic acid with a component composed of polyhydric alcohol and/or an epoxy compound (hereinafter, will be referred to as a polyhydric alcohol component). The acid component may, if necessary, further include saturated polybasic acid, such as aromatic saturated polybasic acid and aliphatic saturated polybasic acid. Also, a part of the polybasic acid may be replaced with monobasic acid. Besides, a part of the polyhydric alcohol may be replaced with monohydric alcohol.

Although the acid value of the unsaturated polyester is not limited, it generally does not exceed 40 mgKOH/g. Also, although the number-average molecular weight of the unsaturated polyester is not limited, it is preferably in a range of 500 to 20000.

The unsaturated polybasic acid used in the acid component may be any compound having in a molecule at least one unsaturated bond capable of being polymerized and a plurality of substituents which can form an ester bond through reaction with a hydroxyl group or epoxy group included in the polyhydric alcohol component. The unsaturated polybasic acid is: for example, α,β-unsaturated polybasic acid, such as maleic acid, fumaric acid, aconitic acid, and itaconic acid; β,γ-unsaturated polybasic acid, such as dihydromuconic acid; anhydrides of these acids; halides of these acids; and alkylesters of these acids. Only one of these compounds cited here may be used solely, or a plurality of these compounds may be used.

The saturated polybasic acid used in the acid component according to the need is: for example, aliphatic saturated polybasic acid, such as malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, and sebacic acid; aromatic saturated polybasic acid, such as phthalic acid, isophthalic acid, terephthalic acid, trimellitic acid and pyromellitic acid; alicyclic saturated polybasic acid, such as HET acid (registered trademark of Occidental Chemical Corporation for chlorendic acid), 1,2-hexahydrophthalic acid, 1,1-cyclobutanedicarboxylic acid, and trans-1,4-cyclohexanedicarboxylic acid; anhydrides of these acids; halides of these acids; and alkylester derivatives of these acids. Only one of these compounds cited here may be used solely, or a plurality of these compounds may be used.

The polyhydric alcohol is: for example, ethylene glycol, diethylene glycol, 1,3-propanediol, 2-methyl-1,3-propanediol, 1,4-butanediol, 1,3-butanediol, 2,3-butanediol, dipropylene glycol, 1,5-pentanediol, 1,6-hexanediol, 2,2-dimethyl-1,3-propanediol (neopentyl glycol), 2-ethyl-1,4-butanediol, 1,7-heptanediol, 1,8-octanediol, 1,9-nonanediol, 1,10-decanediol, 1,4-cyclohexanediol, 1,4-dimethylolcyclohexane, 2,2-diethyl-1,3-propanediol, 3-methyl-1,4-pentanediol, 2,2-diethyl-1,3-butanediol, 4,5-nonanediol, triethylene glycol, glycerine, trimethylolpropane, pentaerythritol, dipentaerythritol, hydrogenated bisphenol A, an addition product of alkylene oxide to hydrogenated bisphenol A, and an addition product of alkylene oxide to bisphenol A. Only one of these compounds cited here may be used solely, or a plurality of these compounds may be used.

The epoxy compound is: for example, ethylene oxide, propylene oxide, butylene oxide, styrene oxide, glycidyl acrylate, glycidyl methacrylate, diglycidyl ether of bisphenol A. Only one of these compounds cited here may be used solely, or a plurality of these compounds may be used.

The ordinary unsaturated polyester is obtained in the above manner.

Replacing the above ordinary unsaturated polyester with an air-setting-type unsaturated polyester produces an air-setting-type unsaturated polyester resin. The air-setting-type unsaturated polyester resin, having among its resin components a component which is easy to react with oxygen, is an unsaturated polyester resin which hardens with discomposition of a complex produced by absorption of oxygen in the air and the consequent dissolution. Therefore, using the air-setting-type unsaturated polyester produces a resin composition of superb hardening characteristics with no curing inhibition by the air.

The air-setting-type unsaturated polyester is an unsaturated polyester manufactured by replacing all or part of the materials of the above-mentioned ordinary unsaturated polyester with a compound having an unsaturated bond, such as an allyl group (details follow). Specifically, the air-setting-type unsaturated polyester can be obtained with at least one of the following replacements: (1) all or part of the ordinary acid components are replaced with unsaturated polybasic acids having an unsaturated bond, such as the below-mentioned allyl group, (2) all or part of the ordinary polyhydric alcohol components are replaced with polyhydric alcohol and/or epoxy compounds having an unsaturated bond, such as the below-mentioned allyl group, (3) all or part of the ordinary polyhydric alcohol components are replaced with alcohol having an unsaturated bond, such as the below-mentioned allyl group.

The unsaturated polybasic acid having an unsaturated bond is: for example, tetrahydrophthalic anhydride, an addition product of maleic anhydride to α-terpinene, an addition product of maleic anhydride to cyclopentadiene, rosin, ester gum, fatty acid of drying oil, and fatty acid of semi-drying oil. Only one of these compounds cited here may be used solely, or a plurality of these compounds may be used.

The polyhydric alcohol having an unsaturated bond is: for example, an allyl ether, such as trimethylolpropane monoallyl ether, trimethylolethane monoallyl ether, pentaerythritol monoallyl ether, pentaerythritol diallyl ether, and glycerine monoallyl ether. The epoxy compound having an unsaturated bond is, for example, allyl glycidyl ether. Only one of these compounds cited here may be used solely, or a plurality of these compounds may be used.

The alcohols having unsaturated bond are: for example, an allyl ether, such as trimethylolpropane diallyl ether, trimethylolethane diallyl ether, pentaerythritol triallyl ether, and glycerine diallyl ether; and a benzyl alcohol. Only one of these compounds cited here may be used solely, or a plurality of these compounds may be used.

Although the compounds having unsaturated bonds may be used in any amount, from the point of view of ensuring a good drying characteristic for workability and preventing deterioration of stability during storage due to excessively providing the air hardening characteristic, the amount is preferably adjusted so that these unsaturated bonds are introduced in a range of 0.05 to 0.80 equivalent amount (the total mol amount of the acid component being 1 equivalent amount).

Moreover, a dicyclopentenyl-group-containing unsaturated polyester is preferably used as the air-setting-type unsaturated polyester. This reduces the curing shrinkage of the resin composition, and improves the appearance of the cured product. The dicyclopentenyl-group-containing unsaturated polyester is obtained by introducing a dicyclopentenyl group to the unsaturated polyester with replacement of at least part of the materials for manufacture of the ordinary unsaturated polyester with a compound having a dicyclopentenyl group.

Specifically, the dicyclopentenyl-group-containing unsaturated polyester can be obtained by replacing part of the acid components of the ordinary unsaturated polyester with an addition product of an unsaturated polybasic acid to dicyclopentadiene. Addition products obtained by adding the aforementioned unsaturated polybasic acids to dicyclopentadiene (e.g., an addition product of unsaturated dicarboxylic acid to dicyclopentadiene, such as an addition product of maleic acid to dicyclopentadiene; an addition product of maleic acid monoester to dicyclopentadiene) may be used as the addition product of an unsaturated polybasic acid to dicyclopentadiene.

Moreover, the dicyclopentenyl-group-containing unsaturated polyester can also be obtained by replacing part of the polyhydric alcohol components of the ordinary unsaturated polyester with, for example, an addition product of glycol to dicyclopentadiene and hydroxydicyclopentadiene.

Among these compounds having a dicyclopentenyl group, the addition product of unsaturated dicarboxylic acid to dicyclopentadiene is preferable: the addition product of maleic acid to dicyclopentadiene is the most preferable. These addition products produce a resin composition which produces a cured product of good characteristics in surface smoothness, dimensional stability, and hot-water resistance. Note that the addition product of maleic acid to dicyclopentadiene may be manufactured with addition of dicyclopentadiene and maleic anhydride in the presence of water.

Moreover, the dicyclopentenyl-group-containing unsaturated polyester can also be obtained by producing a compound having a dicyclopentenyl group with addition of a dicyclopentadiene and either an acid component or polyhydric alcohol component when the acid component and polyhydric alcohol component are polycondensed. In other words, an acid component used for the ordinary unsaturated polyester, a polyhydric alcohol component, and dicyclopentadiene may be mixed to be polycondensed. Alternatively, an acid component and polyhydric alcohol component are mixed, polycondensation is started, and then dicyclopentadiene may be added.

The same materials (the polybasic acid, polyhydric alcohol and epoxy compound) as in the case of the above-mentioned ordinary unsaturated polyester may be used as the materials, except the compounds having a dicyclopentenyl group (or dicyclopentadiene) used for synthesis of the dicyclopentenyl-group-containing unsaturated polyester.

The dicyclopentenyl-group-containing unsaturated polyester preferably includes 10 percent by weight or more of dicyclopentenyl groups, and more preferably includes 20 percent by weight or more of dicyclopentenyl groups. This produces a resin composition which produces a cured product of good physical properties (e.g., gloss, water resistance and strength). Moreover, this produces a resin composition producing neither warp nor fiber pattern and having good surface smoothness when used as an FRP molding product.

Then, the dicyclopentenyl-group-containing unsaturated polyester resin is obtained by diluting the dicyclopentenyl-group-containing unsaturated polyester with an appropriate amount of cross-linking monomer.

Note that the dicyclopentenyl-group-containing unsaturated polyester resin can be synthesized in the conventional manner disclosed in Technical Proceedings, 36th Annual Conference, Reinforced Plastics/Composites Institute, The Society of the Plastics Industry Inc., Session 7-E (1981).

The epoxy(meth)acrylate used for the vinylester resin (epoxy(meth)acrylate resin) is usually obtained from a reaction of epoxy resin and unsaturated monocarboxylic acid.

A compound having at least one epoxy group per molecule may be used as the epoxy resin. Examples of such a compound include a polyglycidyl ether of, for example, a polyhydric phenol and polyhydric alcohol, epoxy novolak, epoxide of diolefin, epoxide of fatty oil, and epoxide of drying oil. The unsaturated monocarboxylic acid is, for example, acrylic acid, methacrylic acid, cinnamic acid and derivatives of these acids. Only one of these compounds cited here may be used solely, or a plurality of these compounds may be used. Alternatively, these compounds may be modified by adding another monobasic acid and/or a polybasic acid if necessary.

The urethane(meth)acrylate is obtained from a reaction of an unsaturated monoalcohol and polyisocyanate.

The unsaturated monoalcohol is, for example, 2-hydroxyethyl (meth)acrylate, 2-hydroxypropyl (meth)acrylate, oligoethylene glycol mono(meth)acrylate, oligopropylene glycol mono(meth)acrylate, and allyl alcohol. Only one of these compounds cited here may be used solely, or a plurality of these compounds may be used.

The polyisocyanate is, for example, tolylene diisocyanate, hydrogenated tolylene diisocyanate, metaxylylene diisocyanate, hexamethylene diisocyanate, isophorone diisocyanate, diphenylmethane diisocyanate, and hydrogenated diphenylmethane diisocyanate. Only one of these compounds cited here may be used solely, or a plurality of these compounds may be used.

The polyester(meth)acrylate is obtained from a reaction of polyester polyol with unsaturated monocarboxylic acid or its derivative, or from a reaction of polyesterpolycarboxylic acid with the unsaturated monoalcohol. The materials of the unsaturated polyester, vinylester, and urethane(meth) acrylate may be used as the materials of the polyester(meth) acylate (unsaturated monocarboxyl acid, its derivative, and unsaturated monoalcohol).

The cross-linking monomer to be mixed with the resin solid is: for example, styrene-type monomer, such as styrene, vinyltoluene, p-tert-butylstyrene, α-methylstyrene, p-chlorostyrene, p-methylstyrene, p-chloromethylstyrene, and divinylbenzene; allylester-type monomer, such as diallylphthalate, diallylisophthalate, triallylcyanulate, and triallylisocyanulate; and (meth)acrylic monomer, such as, (meth)acrylic acid, methyl(meth)acrylate, ethyl(meth) acrylate, propyl(meth)acrylate, butyl(meth)acrylate, 2-ethylhexyl(meth)acrylate, cyclohexyl(meth)acrylate, 2-hydroxypropyl(meth)acrylate, 2-hydorxypropyl(meth) acrylate, glycidyl (meth)acrylate, ethylene glycol di(meth) acrylate, diethylene glycol di(meth)acrylate, an addition product of di(meth)acrylic acid to bisphenol A diglycidyl ether, trimethylolpropane tri(meth)acrylate, trimethylolethane tri(meth)acrylate, glycerine tri(meth)acrylate, pentaerythritol tetra(meth)acrylate, and dipentaerythritol hexa (meth)acrylate. Only one of these compounds cited here may be used solely, or a plurality of these compounds may be used.

Moreover, air hardening characteristics can be provided to the resin composition by using a compound having an unsaturated bond, such as an allyl group (details follow) as the cross-linking monomer. The compound having an unsaturated bond is, for example, allyl ether of methylol melamine, adipate of glycerine diallyl ether, allyl acetal, allyl ether of methylol glyoxal ureine. Only one of these compounds cited here may be used solely, or a plurality of these compounds may be used.

The radical-setting-type thermosetting resin (hereinafter, will be referred to as the resin) having desirable viscosity can be obtained by adding the cross-linking monomer to the resin solid. The weight ratio of the resin solid and the cross-linking monomer in the resin is usually in a range of 10:90 to 90:10.

The resin composition in accordance with the present invention is the dicyclopentenyl-group-containing unsaturated polyester resin composition, which contains the dicyclopentenyl-group-containing unsaturated polyester resin, a phenothiazine (a) and an anion producing compound (b). Moreover, the resin composition in accordance with the present invention is thermosetting resin composition which contains the thermosetting resin, a phenothiazine (a), an anion producing compound (b) and a phosphorous ester (c). With this composition, it is possible to provide a resin composition which is stable during storage, produces very little gel time drift, and which produces a cured product of good characteristics in surface drying, hue, and water resistance.

Phenothiazine and/or its derivative can be used as the phenothiazine (a). That is, a phenothiazine with no replacement can be used as the phenothiazine (a), and so can a phenothiazine derivative obtained by replacing hydrogen of the phenothiazine with a substituent, such as an alkyl group, alkoxy group, amino group, alkylamino group, nitro group and halogen group, in order to improve solubility of the resin.

The phenothiazine (a) is preferably used in a range of 0.001 to 0.05 parts by weight per 100 parts by weight of the resin. If the phenothiazine (a) is used in a smaller ratio than this range, enough stability during storage may not be obtained. If the phenothiazine (a) is used in a larger ratio than this range, since the gel time drift tends to be greater, the objects of the present invention may not be achieved.

The anion producing compound (b) is at least one compound selected from the group consisting of an onium salt and an ionic inorganic metallic compound.

At least one kind of salt selected from the group of an ammonium salt, phosphonium salt and sulfonium salt may be used as the onium salt. The substituent on the central atom of the onium in the above onium salt is, for example, a hydrogen atom, alkyl group and aryl group. When the resin is required be stored stably over even a longer period of time, organic onium salt (e.g., a quaternary ammonium salt) whose substituents on the central atom of the onium are all organic groups, such as an alkyl group and aryl group, are preferred.

Inorganic acid salts, such as onium halide, sulfate, sulfite, phosphate, phosphite, hypophosphite, borate, nitrate, thiocyanate, chromate and cyanate; organic acid salts, such as acetate and p-toluenesulfonate; hydroxides; hydration products of these inorganic acid salts and organic acid salts; and metallic complexes may be used as the onium salt. When the resin is required to be stored stably over even a longer period of time, organic onium halide is especially useful.

Organic onium chloride, organic onium bromide, and organic onium iodide may be used as the organic onium halide. The organic onium halide is, for example, quaternary ammonium chloride, such as tetramethylammonium chloride, tetraethylammonium chloride, diallyldimethylammonium chloride, tetra-n-butylammonium chloride, lauryltrimethylammonium chloride, stearyltrimethylammonium chloride, and triethylbenzylammonium chloride; quaternary phosphonium chloride, such as benzyltriphenylphosphonium chloride; quaternary ammonium bromide obtained by replacing a chlorine ion of the quaternary ammonium chloride with a bromine ion; quaternary phosphonium bromide obtained by replacing a chlorine ion of a quaternary phosphonium chloride with a bromine ion; and sulfonium iodide, such as trimethylsulfonium iodide. When solubility into resin, coloring or water resistance of the cured product is taken into consideration, use of the quaternary ammonium bromide having a benzyl group as a substituent on a nitrogen atom is very effective.

Salt composed of a metallic positive ion and an inorganic negative ion may be used as the ionic inorganic metallic compound. Especially, metallic halides, such as copper (II) chloride, iron (III) chloride, calcium (III) chloride, cobalt (II) chloride, manganese (II) chloride, nickel (II) chloride, potassium chloride, are appropriate for use.

The anion producing compound (b) is preferably used in a range of 0.002 to 0.1 parts by weight per 100 parts by weight of the resin. If the anion producing compound (b) is used in a smaller ratio than this range, enough stability during storage may not be obtained. If the anion producing compound (b) is used in a larger ratio than this range, curing acceleration effect by the anion producing compound (b) is recognized, and stability during storage may worsen contrariwise. When stability during storage and gel time drift of the resin composition, and surface drying, hue and water resistance of the cured product are all taken into consideration, the anion producing compound (b) is especially preferably used in a range of 0.005 to 0.02 parts by weight per 100 parts by weight of the resin.

The phosphorus acid ester (c) is, for example, monophosphite, such as monophenylphosphite and monobutylphosphite; diphosphite, such as diphenylphosphite and dibutylphosphite; triphosphite, such as tributylphosphite, tris(chloroethyl)phosphite, triphenylphosphite and tris(nonylphenyl)phosphite. Triphenylphosphite is especially preferable because of its versatility and good effect of improving stability during storage.

The phosphorus acid ester (c) may be used in a range of 0.005 to 0.15 parts by weight per 100 parts by weight of the resin. Nevertheless, when hue, water resistance, etc. of the cured product are taken into consideration, the phosphorous ester (c) is preferably used in a range of 0.01 to 0.05 parts by weight.

The phenothiazine (a), the anion producing compound (b) and phosphorous ester (c) are used so that the total amount thereof is in a range of 0.003 to 0.2 parts by weight per 100 parts by weight of the resin, and preferably, in a range of 0.005 to 0.05 parts by weight. Generally, viscosity increase during storage can be effectively prevented with a large amount of any of the phenothiazine (a), the anion producing compound (b) or the phosphorous ester (c). The resin composition in accordance with the present invention is, however, normally added in a smaller quantity than that of any of the three compounds added solely, but produces the same, or even better, effect of suppressing viscosity increase.

Consequently, the gel time drift, which is a defect of the conventionally known polymerization inhibitor, becomes practically ignorable. Besides, decline of coloring and water resistance of the cured product can be suppressed. It is evident from the above discussions that the components of the phenothiazine (a) and the anion producing compound (b), or of the phenothiazine (a), the anion producing compound (b) and the phosphorous ester (c) integrally reacts to achieve the objects of the present invention. To describe this fact in the another way round, other compositions than that in accordance with the present invention inevitably needs a use of the polymerization inhibitor in a large quantity, thereby hardly producing as superb an effect as the compositions in accordance with the present invention.

Although the resin composition in accordance with the present invention is composed of the phenothiazine (a), the anion producing compound (b) and the phosphorous ester (c), the conventionally known quinone-type inhibitor may be further added. The quinone-type inhibitor is, for example, hydroquinone, methylhydroquinone, dimethylhydroquinone, trimethylhydroquinone, hydroquinone monomethyl ether, 2,5-di-tert-butylhydroquinone, p-tert-butylcatechol, mono-t-butylhydroquinone, p-benzoquinone, naphthoquinone, 2,5-di-tert-butyl-p-cresol, α-naphthol and nitrophenol. These quinone-type inhibitors are used in a range of 0 to 0.05 parts by weight per 100 parts by weight of the resin. Either one of these quinone-type inhibitors or a plurality of them may be added to the resin.

Note that the phenothiazine (a), the anion producing compound (b), the phosphorous ester (c) and the quinone-type inhibitor may be mixed in any sequence. Besides, a method and apparatus for the mixture conventionally used in this industry may be employed with no modification. Moreover, as to the phenothiazine (a) and the quinone-type inhibitor, the total quantity or part of the quantity may be added in a manufacturing process of the resin.

In addition, when the resin composition is manufactured with a process of obtaining the dicyclopentenyl-group-containing unsaturated polyester by polycondensing the unsaturated polyester material containing a compound having a dicyclopentenyl group, and a process of mixing cross-linking monomer with the obtained dicyclopentenyl-group-containing unsaturated polyester, the phenothiazine (a) and anion producing compound (b) may be added in at least one of these two processes. That is, the phenothiazine (a) and anion producing compound (b) may be added on at least one of the following occasions: (1) when the unsaturated polyester materials are placed, (2) while the unsaturated polyester materials are being polycondensed, (3) after the unsaturated polyester materials are polycondensed, and (4) after the cross-linking monomer is mixed.

The resin composition in accordance with the present invention may be arranged so as to be cured with the curing agent, curing accelerator, etc., and therefore may include the curing agent, curing accelerator, etc.

Organic peroxide catalyst, which is normally used in the unsaturated polyester resin industry may be used as the curing agent. The organic peroxide catalyst is, for example, benzoyl peroxide, lauroyl peroxide, acetyl peroxide, methylethylketone peroxide, cumenehydro peroxide, di-tert-butyl peroxide, tert-butyl perbenzoate, cyclohexanone peroxide. The curing agent is used in a range of 0.3 to 3 parts by weight per 100 parts by weight of the resin, and preferably in a range of 0.5 to 1.5 parts by weight.

The curing accelerator may be any metallic compound with the redox action: for example, a metal carboxylate, such as metal aliphatic carboxylate, metal aromatic carboxylate and metal alicyclic carboxylate; and a metallic chelate complex. A metallic compound containing at least one metal (hereinafter, will be referred to as a specific metal) selected from the group consisting of cobalt, manganese, tin, vanadium, and copper is especially preferable for use as the curing accelerator because of great acceleration effect when the resin hardens. The metal compound containing a specific metal is, for example, naphthenates of the specific metal, octoates of the specific metal, phosphates of the specific metal and a acetylacetonate complex of the specific metal.

The curing accelerator is used in a range of 0.0001 to 0.1 parts by weight per 100 parts by weight of the resin. Since most of the curing accelerators are powder, they may resolved in, for example, various solvents and cross-linking monomers for easy workability so as to produce a solution having 1 to 10 percent by weight of metallic components before being added to the resin.

Moreover, conventionally known curing acceleration promoter, such as dimethylaniline, acetylacetone and acetoacetanilide may be used along with these curing accelerators. These curing accelerators and promoters may be included in the resin composition in advance or mixed with the curing agent immediately prior to curing of the resin, without changing the acceleration effect.

A setting temperature for curing of the resin composition with the curing agent is varies depending on conditions, such as the type and quantity of the polymerization inhibitor, curing accelerator and curing agent, but is generally in a range of 0° to 140° C.

The resin composition obtained in the above manner which includes the dicyclopentenyl-group-containing unsaturated polyester, the monomer and the curing accelerator is stable during storage and has good hardening characteristics.

This resin composition preferably has the following characteristics: (1) The content ratio of the dicyclopentenyl groups to the dicyclopentenyl-group-containing unsaturated polyester is not less than 20 percent by weight. (2) Storable time measured with anti-skinning stability test at 60° C. is not shorter than 8 days. (3) The gel time at room temperature measured for a mixture of 0.55 parts by weight of the methylethylketone peroxide per 100 parts by weight of the resin composition is not longer than 60 minutes. These characteristics make it possible to provide the dicyclopentenyl-group-containing unsaturated polyester resin composition which has even better stability during storage and hardening characteristics, and which produces a cured product of good hue, water resistance and strength.

The resin composition obtained in the above manner in accordance with the present invention may be, if necessary, mixed with, for example, a thixotropic agent, such as anhydrous pulverized silica and asbestos; a filler, such as calcium carbonate, clay, talc, silica sand, and glass powder; stabilizers, such as an iron compound, alkaline metal and alkaline earth metal; a volatility suppressing agent, such as paraffin and wax, and may be used for various applications: for example, forming material for various FRP forming products, a resin for molding, a resin for buttons, a resin for putty, a resin for decorative sheets, a resin for paint, a resin for adhesive and a resin for insulation varnish. In a case where the above-mentioned resin composition is the dicyclopentenyl-group-containing unsaturated polyester resin composition, the resin composition may be mixed for use with another kind of the thermosetting resins, such as an unsaturated polyester resin, vinylester resin, urethaneacrylate resin, polyesteracrylate resin, and allylester resin.

Although the present invention will be further explained with embodiments in the following description, the embodiments are merely illustrative, not restrictive. In the embodiments, "part" represents part by weight unless otherwise specified, and "%" represents percent by weight unless otherwise specified.

First, manufacture examples of the resin composition in accordance with the present invention are explained. Note that the ratio of the dicyclopentenyl groups to the dicyclopentenyl-group-containing unsaturated polyester in the resin manufacture examples are calculated as follows.

First, the weight of components eliminated by condensation of the acid components and polyhydric alcohol components is subtracted from the total weight of the acid and polyhydric alcohol components (including the dicyclopentenyl-group-containing compound), i.e., components forming an ester chain. It is supposed that the obtained value equals the total weight of the dicyclopentenyl-group-containing unsaturated polyester. Also, it is supposed that a value obtained by multiplying the mol amount of the used dicyclopentenyl-group-containing compound by the molecular weight (i.e., 133) of the dicyclopentenyl group equals the weight of the dicyclopentenyl groups. Then, it is supposed that a value obtained by dividing the weight of the dicyclopentenyl groups by the total weight of the dicyclopentenyl-group-containing unsaturated polyester equals the ratio of the dicyclopentenyl groups.

Note that if the dicyclopentenyl-group-containing compound is arranged to be produced in polycondensation, the weight of the dicyclopentenyl-group-containing compound is supposed to be equal to a theoretic amount calculated from the weight of the materials used for production of the dicyclopentenyl-group-containing compound.

A calculation example is given below:
The following example is for a case where an addition product of maleic acid to dicyclopentadiene produced from 1 mol (132 g) dicyclopentadiene, 1 mol (98 g) maleic anhydride and 1 mol (18 g) water is dehydrated and condensed with 0.6 mol (37.2 g) ethylene glycol. First, since the theoretic amount of the produced addition product of maleic acid to dicyclopentadiene is 1 mol, the weight is given by the equation: 132 g+98 g+18 g=248 g. Since there are 1.2 mol hydroxyl groups and 1 mol carboxyl groups, 1 mol water is eliminated with the condensation, and its weight is: 18×1=18 g. Therefore, the ratio of the dicyclopentenyl groups is given by the following equation: [133 g/(248 g+37.2 g−18 g)]× 100=49.8 percent by weight.

[RESIN MANUFACTURE EXAMPLE 1]

196 parts maleic anhydride, 278 parts (95% pure) dicyclopentadiene and 36 parts demineralized water were placed into a four-necked flask, and addition reaction was performed under nitrogen stream at 130° C. for 3 hours to obtain an addition product of maleic acid to dicyclopentadiene. Next, 118 parts phthalic anhydride and 124 parts ethylene glycol were added and mixed. Then the mixture was dehydrated and condensed in a widely-used manner under nitrogen stream at 200° C. for 8 hours to obtain a dicyclopentenyl-group-containing unsaturated polyester having an acid value of 25 mgKOH/g and a dicyclopentenyl group ratio of 38 percent by weight. This dicyclopentenyl-group-containing unsaturated polyester was dissolved at 80° C. in a solution in which 0.1 parts hydroquinone is dissolved in 310 parts styrene monomer. A dicyclopentenyl-group-containing unsaturated polyester resin (I) of a viscosity of 3.0 stokes/25° C. was thus obtained.

[RESIN MANUFACTURE EXAMPLE 2]

686 parts maleic anhydride, 278 parts (95% pure) dicyclopentadiene, 498 parts isophthalic acid and 798 parts propylene glycol were placed into a four-necked flask, and addition reaction was performed under nitrogen stream at 140° C. for 7.5 hours. Then the mixture was dehydrated and condensed at 215° C. for 8 hours to obtain a dicyclopentenyl-group-containing unsaturated polyester having an acid value of 20 mgKOH/g. This dicyclopentenyl-group-containing unsaturated polyester was dissolved at 80° C. in a solution in which 0.32 parts hydroquinone is dissolved in 1258 parts styrene monomer. A dicyclopentenyl-group-containing unsaturated polyester resin (II) of a viscosity of 4.0 stokes/25° C. was thus obtained.

[RESIN MANUFACTURE EXAMPLE 3]

196 parts maleic anhydride, 278 parts (95% pure) dicyclopentadiene and 36 parts demineralized water were placed into a four-necked flask, and addition reaction was performed under nitrogen stream at 130° C. for 3 hours to obtain an addition product of maleic acid to dicyclopentadiene. Next, 392 parts maleic anhydride, 592 parts phthalic anhydride and 718 parts propylene glycol were added and mixed. Then the mixture was dehydrated and condensed in a widely-used manner under nitrogen stream at 200° C. for 8 hours to obtain a dicyclopentenyl-group-containing unsaturated polyester having an acid value of 25 mgKOH/g. This dicyclopentenyl-group-containing unsaturated polyester was dissolved at 80° C. in a solution in which 0.31 parts hydroquinone is dissolved in 1094 parts styrene monomer. A dicyclopentenyl-group-containing unsaturated polyester resin (III) of a viscosity of 4.5 stokes/25° C. was thus obtained.

[RESIN MANUFACTURE EXAMPLE 4]

740 parts phthalic anhydride, 490 parts maleic anhydride and 798 parts propylene glycol were placed in a four-necked flask, then dehydrated and condensed in a widely-used manner under nitrogen stream at 200° C. for 7 hours to obtain an unsaturated polyester having an acid value of 30 mgKOH/g. This unsaturated polyester was dissolved at 80° C. in a solution in which 0.31 parts hydroquinone is dissolved in 1232 parts styrene monomer. An unsaturated polyester resin (IV) having a viscosity of 2.5 stokes/25° C. was thus obtained.

[RESIN MANUFACTURE EXAMPLE 5]

296 parts phthalic anhydride, 304 parts tetrahydro phthalic anhydride, 588 parts maleic anhydride and 798 parts propylene glycol were placed in a four-necked flask, then dehydrated and condensed in a widely-used manner under nitrogen stream at 200° C. for 7 hours to obtain an unsaturated polyester having an acid value of 30 mgKOH/g. This air-setting-type unsaturated polyester was dissolved at 80° C. in a solution in which 0.30 parts hydroquinone is dissolved in 1204 parts styrene monomer. An air-setting-type unsaturated polyester resin (v) having a viscosity of 3.4 stokes/25° C. was thus obtained.

[RESIN MANUFACTURE EXAMPLE 6]

592 parts phthalic anhydride, 588 parts maleic anhydride, 1007 parts diethylene glycol, 116 parts allyl alcohol, and 0.30 parts hydroquinone were placed in a four-necked flask, then dehydrated and condensed in a widely-used manner under nitrogen stream at 200° C. for 7.5 hours to obtain an air-setting-type unsaturated polyester having an acid value of 20 mgKOH/g. This air-setting-type unsaturated polyester was dissolved at 80° C. in 910 parts styrene monomer. An air-setting-type unsaturated polyester resin (VI) having a viscosity of 4.0 stokes/25° C. was thus obtained.

[RESIN MANUFACTURE EXAMPLE 7]

370 parts bisphenol A diglycigyl ether-type epoxy resin (185 epoxy equivalent), 172 parts methacrylic acid, 1.1 parts triethylamine and 0.21 parts hydroquinone were placed in a four-necked flask, then heated at 100° C. to 110° C. under air atmosphere for 6 hours to obtain a vinylester having an acid value of 3 mgKOH/g. Next, 61 parts tetrahydrophthalic anhydride and 325 parts styrene monomer were added and mixed. A reaction was performed at 100° C. for 2 hours and then cooled. A vinylester resin (VII) having a viscosity of 3.6 stokes/25° C. was thus obtained.

[RESIN MANUFACTURE EXAMPLE 8]

302 parts 2-hydroxypropyl methacrylate, 0.16 parts p-benzoquinone, 245 parts methyl methacrylate, and 0.82 parts dibutyltin dilaurate were placed in a four-necked flask, and 270 parts liquid diphenylmethane diisocyanate oligomer (135 isocyanate equivalent) was added dropwise at 60° C. under air atmosphere for 2 hours. The mixture was then stirred for 3 hours while being maintained at the same temperature. Next, the mixture was stirred for 1 hour at 90° C. and then cooled. An urethane(meth)acrylate resin (VIII) having a viscosity of 3.0 stokes/25° C. was thus obtained.

The following description will present embodiments and comparative examples using the resins obtained with the above manufacture examples. Measuring methods of various characteristics of the resin composition in the embodiments and comparative examples are as follows:

[RESIN VISCOSITY AND DRIFT OF GEL TIME AT ROOM TEMPERATURE]

First, gardener viscosity and a gel time at room temperature (25° C.) of resin composition were measured immediately after a redox accelerator and various additives were added and mixed (immediately after manufacture). Next, 500 g resin composition was put in a general-purpose can of a 500 g capacity and sealed. The can was kept in an air-circulating-type thermostatic container maintained at 50° C. Then measurement of the gardener viscosity and gel time at room temperature (25° C.) was performed with respect to the resin composition which had been kept for predetermined periods of time (1, 2 and 3 months).

The gardener viscosity and gel time at room temperature were measured in accordance with JIS K-6901. 1 phr (i.e., 1 part by weight per 100 parts by weight of the resin composition) diluted product (55% pure) of methylethylketone peroxide was added as a curing agent for the measurement of the gel time at room temperature. Therefore, the addition amount of the methylethylketone peroxide to 100 parts by weight of the resin composition equals 0.55 parts by weight.

[HUE OF CURED PRODUCT]

3 g methylethylketone peroxide (55% pure diluted product) was added as a curing agent to 300 g of the resin composition immediately after adding the redox accelerator and various additives. The mixture was then depressurized to be deaerated and poured into a 3 mm thick guide which is made of two glass plates having a measurement of 300 mm×300 mm. The mixture was left for 24 hours at room temperature so as to be cured. Next, the resin composition was treated with after-cure at 110° C. for 2 hours and then removed from the glass plates. A molded plate of the resin composition was thus obtained. Hue of the molded plate was evaluated visually.

[BOILING WATER RESISTANCE OF MOLDED PRODUCT]

A molded plate of the resin composition obtained in the same manner as in the experiment of the hue of the cured product was cut into a necessary number of experimental pieces in a rectangle shape of 75 mm in length and 25 mm in width. The experimental pieces were soaked in boiled demineralized water. After being soaked for a predetermined period of time, the experimental pieces were taken out of the demineralized water. The water content was then wiped off from the surface of the experimental pieces, and changes in appearances were observed. The boiling water resistance of the molded plate was defined as the elapsed time between the start of soaking the experimental pieces into the demineralized water and the occurrence of a star-shaped crack to the experimental pieces.

[60° C. ANTI-SKINNING STABILITY TEST]

The resin composition was put in a glass test tube of 18 mm in outer diameter and 180 mm in height so as to fill 70 mm of the test tube from its bottom. The test tube was loosely sealed by putting absorbent cotton into the test tube so that the cotton fills 20 mm of the test tube from its upper end. Next, the test tube was left in an air-circulating-type thermostatic container maintained at 60° C. The test tube was inclined every 24 hours for visually observing changes in appearance of the resin composition in the test tube. The storable time representing the anti-skinning stability was defined as the elapsed time (the number of days) between the start of keeping the test tube in the thermostatic container and the visual recognition of occurrence of gel at the contact surface between the air and the resin composition.

[SURFACE DRYING CHARACTERISTIC]

First, 1 phr (i.e., 1 part by weight per 100 parts by weight of the resin composition) of methylethylketone peroxide (55% pure diluted product) was added as a curing agent respectively to the resin composition immediately after manufacture and to the resin composition which had been kept at 50° C. for 3 months after manufacture in order to obtain resin mixtures. The latter resin was kept in the following manner: 500 g of the resin composition was put in a general-purpose can of a 500 g capacity. The can was then closely sealed and kept in an air-circulating-type thermostatic container maintained at 50° C. Next, The resin mixtures were depressurized to be deaerated and then applied on a glass plate so that the applied resin mixtures has a thickness of 1 mm. The resin mixtures were then kept in a thermostatic and humidstatic room maintained at a temperature of 25° C. and a humidity of 60% for evaluating the stickiness with touch. The "drying time" representing the surface drying characteristic was defined as the elapsed time between the addition of the curing agent and the loss of the stickiness from the surface of the cured coating.

[EMBODIMENTS 1 THROUGH 3 AND COMPARATIVE EXAMPLES 1 THROUGH 4]

The redox accelerator (8% cobalt octoate) and various additives (dimethylaniline, tert-butylhydroquinone, phenothiazine, triethylbenzylammonium chloride, and calcium chloride) shown in Table 1 were added and mixed with the dicyclopentenyl-group-containing unsaturated polyester resin (I) obtained with the resin manufacture example 1 (shown as (I) in tables) in the compounding amounts shown in Table 1 so as to obtain the radical-setting-type thermosetting resin composition.

Note that the compounding amounts shown in Tables 1 through 24 express adding amounts per 1 part by weight of the resin (the total amount of the resin solid and crosslinking monomer) in ppm ($1 \times 10^{-6}$ parts by weight).

Table 2 shows results of measurements of gardener viscosities, drifts of gel time at room temperature (25° C.), hue of the cured product and boiling water resistance of the molded plate of the obtained radical-setting-type thermosetting resin composition.

TABLE 1

| | EMBODIMENTS | | | COMPARATIVE EXAMPLES | | | |
|---|---|---|---|---|---|---|---|
| | 1 | 2 | 3 | 1 | 2 | 3 | 4 |
| RESIN | (I) | (I) | (I) | (I) | (I) | (I) | (I) |
| 8% COBALT OCTOATE (ppm) | 3000 | 3000 | 3000 | 3000 | 3000 | 3000 | 3000 |
| DIMETHYL ANILINE (ppm) | 300 | 300 | 300 | 300 | 300 | 300 | 300 |
| TERT-BUTYLHYDROQUINONE (ppm) | 20 | 20 | 20 | 20 | 20 | 20 | 20 |
| PHENOTHIAZINE (ppm) | 100 | 100 | 100 | 100 | 300 | — | — |
| TRIETHYLBENZYLAMMONIUM CHLORIDE (ppm) | 50 | 100 | — | — | — | 300 | — |
| CALCIUM CHLORIDE (ppm) | — | — | 300 | — | — | — | 500 |

TABLE 2

| | | EMBODIMENTS | | | COMPARATIVE EXAMPLES | | | |
|---|---|---|---|---|---|---|---|---|
| | | 1 | 2 | 3 | 1 | 2 | 3 | 4 |
| RESIN VISCOSITY AND GEL TIME AT ROOM TEMPERATURE | IMMEDIATELY AFTER MANUFACTURE GARDENER VISCOSITY (ST) | 3.0 | 3.0 | 3.0 | 3.0 | 3.0 | 3.0 | 3.0 |
| | GEL TIME AT ROOM TEMPERATURE (MINUTES) | 15.8 | 14.0 | 30.0 | 22.0 | 45.0 | 13.8 | 25.0 |
| | STORED AT 50° C. FOR 1 MONTH GARDENER VISCOSITY (ST) | 3.0 | 3.0 | 3.0 | GEL | 3.0 | GEL | GEL |
| | GEL TIME AT ROOM TEMPERATURE (MINUTES) | 16.0 | 13.5 | 29.0 | | >100 | | |
| | STORED AT 50° C. FOR 2 MONTHS GARDENER VISCOSITY (ST) | 3.1 | 3.0 | 3.1 | | 3.2 | | |
| | GEL TIME AT ROOM TEMPERATURE (MINUTES) | 16.0 | 13.8 | 26.0 | | >100 | | |
| | STORED AT 50° C. FOR 3 MONTHS GARDENER VISCOSITY (ST) | 3.3 | 3.1 | 3.2 | | 3.4 | | |
| | GEL TIME AT ROOM TEMPERATURE (MINUTES) | 17.0 | 15.0 | 26.0 | | >100 | | |
| HUE OF CURED PRODUCT | | #LY | #LY | #LB | #LY | #Br | #LG | #Bl |
| BOILING WATER RESISTANCE OF MOLDED PLATE (HOURS) | | 24 TO 40 | 24 TO 40 | 24 TO 40 | 24 TO 40 | 24 TO 40 | 8 TO 24 | 8 TO 24 |

[Note]
LY = light yellow,
LB = light blue,
Br = brown,
LG = light green,
Bl = blue

[EMBODIMENTS 4 THROUGH 6 AND COMPARATIVE EXAMPLES 5 THROUGH 8]

The redox accelerator and various additives shown in Table 3 were added and mixed with the dicyclopentenyl-group-containing unsaturated polyester resin (II) obtained with the resin manufacture example 2 (shown as (II) in tables) in the compounding amounts shown in Table 3 so as to obtain the radical-setting-type thermosetting resin composition.

Table 4 shows results of measurements of gardener viscosities, drifts of gel time at room temperature (25° C.), hue of the cured product and boiling water resistance of the molded plate of the obtained radical-setting-type thermosetting resin composition.

TABLE 3

| | EMBODIMENTS | | | COMPARATIVE EXAMPLES | | | |
|---|---|---|---|---|---|---|---|
| RESIN | 4 (II) | 5 (II) | 6 (II) | 5 (II) | 6 (II) | 7 (II) | 8 (II) |
| 8% COBALT OCTOATE (ppm) | 3000 | 3000 | 3000 | 3000 | 3000 | 3000 | 3000 |
| DIMETHYL ANILINE (ppm) | 300 | 300 | 300 | 300 | 300 | 300 | 300 |
| TERT-BUTYLHYDROQUINONE (ppm) | 80 | 85 | 80 | 30 | — | 100 | 180 |
| PHENOTHIAZINE (ppm) | 100 | — | — | 100 | 300 | — | — |
| 2-CHLOROPHENOTHIAZINE (ppm) | — | 100 | — | — | — | — | — |
| 2-ACETYLPHENOTHIAZINE (ppm) | — | — | 100 | — | — | — | — |
| TRIETHYLBENZYL AMMONIUM BROMIDE (ppm) | 100 | 100 | 100 | — | — | 100 | 500 |

TABLE 4

| | | EMBODIMENTS | | | COMPARATIVE EXAMPLES | | | |
|---|---|---|---|---|---|---|---|---|
| | | 4 | 5 | 6 | 5 | 6 | 7 | 8 |
| RESIN VISCOSITY AND GEL TIME AT ROOM TEMPERATURE | IMMEDIATELY AFTER MANUFACTURE GARDENER VISCOSITY (ST) | 4.0 | 4.0 | 4.0 | 4.0 | 4.0 | 4.0 | 4.0 |
| | GEL TIME AT ROOM TEMPERATURE (MINUTES) | 25.1 | 26.1 | 25.4 | 25.8 | 47.0 | 25.9 | 24.8 |
| | STORED AT 50° C. FOR 1 MONTH GARDENER VISCOSITY (ST) | 4.0 | 4.0 | 4.0 | GEL | 4.1 | GEL | GEL |
| | GEL TIME AT ROOM TEMPERATURE (MINUTES) | 25.4 | 26.6 | 24.9 | | >100 | | |
| | STORED AT 50° C. FOR 2 MONTHS GARDENER VISCOSITY (ST) | 4.0 | 4.0 | 4.0 | | 4.1 | | |
| | GEL TIME AT ROOM TEMPERATURE (MINUTES) | 25.8 | 27.1 | 25.4 | | >100 | | |
| | STORED AT 50° C. FOR 3 MONTHS GARDENER VISCOSITY (ST) | 4.0 | 4.0 | 4.0 | | 4.1 | | |
| | GEL TIME AT ROOM TEMPERATURE (MINUTES) | 26.2 | 26.3 | 25.2 | | >100 | | |
| HUE OF CURED PRODUCT | | #LY | #LY | #LY | #LY | #Br | #LY | #GB |
| BOILING WATER RESISTANCE OF MOLDED PLATE (HOURS) | | 400 TO 500 | 400 TO 500 | 400 TO 500 | 400 TO 500 | 300 TO 400 | 400 TO 500 | 100 TO 200 |

[NOTE]
LY = light yellow,
Br = brown,
GB = greenish brown

[EMBODIMENTS 7 THROUGH 11]

The redox accelerator and various additives shown in Table 5 were added and mixed with the dicyclopentenyl-group-containing unsaturated polyester resin (III) obtained with the resin manufacture example 3 (shown as (III) in tables) in the compounding amounts shown in Table 5 so as to obtain the radical-setting-type thermosetting resin composition.

Table 6 shows results of measurements of gardener viscosities, drifts of gel time at room temperature (25° C.), hue of the cured product and boiling water resistance of the molded plate of the obtained radical-setting-type thermosetting resin composition.

TABLE 5

| RESIN | EMBODIMENTS | | | | |
|---|---|---|---|---|---|
| | 7 (III) | 8 (III) | 9 (III) | 10 (III) | 11 (III) |
| 8% COBALT OCTOATE (ppm) | 3000 | 3000 | 3000 | 3000 | 3000 |
| DIMETHYL ANILINE (ppm) | 300 | 300 | 300 | 300 | 300 |
| TERT-BUTYLHYDROQUINONE (ppm) | 90 | 95 | 95 | 60 | 50 |
| PHENOTHIAZINE (ppm) | 100 | 100 | 100 | 100 | 100 |
| TRIETHYLBENZYL AMMONIUM BROMIDE (ppm) | 150 | — | — | — | — |
| TRIALLYLBENZYL AMMONIUM CHLORIDE (ppm) | — | 150 | — | — | — |
| TETRAETHYLAMMONIUM ACETATE (ppm) | — | — | 150 | — | — |
| TETRABUTYLAMMONIUM HYDROXIDE (ppm) | — | — | — | 150 | |
| TETRABUTYLAMMONIUM SULFATE (ppm) | — | — | — | — | 150 |

TABLE 6

| | | EMBODIMENTS | | | | |
|---|---|---|---|---|---|---|
| | | 7 | 8 | 9 | 10 | 11 |
| RESIN VISCOSITY AND GEL TIME AT ROOM TEMPERATURE | IMMEDIATELY AFTER MANUFACTURE | | | | | |
| | GARDENER VISCOSITY (ST) | 4.5 | 4.5 | 4.5 | 4.5 | 4.5 |
| | GEL TIME AT ROOM TEMPERATURE (MINUTES) | 24.6 | 24.8 | 24.6 | 25.1 | 25.0 |
| | STORED AT 50° C. FOR 1 MONTH | | | | | |
| | GARDENER VISCOSITY (ST) | 4.5 | 4.5 | 4.5 | 4.5 | 4.5 |
| | GEL TIME AT ROOM TEMPERATURE (MINUTES) | 25.3 | 24.6 | 24.3 | 25.1 | 25.7 |
| | STORED AT 50° C. FOR 2 MONTHS | | | | | |
| | GARDENER VISCOSITY (ST) | 4.5 | 4.5 | 4.5 | 4.5 | 4.5 |
| | GEL TIME AT ROOM TEMPERATURE (MINUTES) | 24.8 | 25.1 | 24.4 | 25.0 | 26.2 |
| | STORED AT 50° C. FOR 3 MONTHS | | | | | |
| | GARDENER VISCOSITY (ST) | 4.5 | 4.5 | 4.5 | 4.5 | 4.5 |
| | GEL TIME AT ROOM TEMPERATURE (MINUTES) | 25.2 | 24.9 | 25.0 | 25.5 | 26.6 |
| HUE OF CURED PRODUCT | | LIGHT YELLOW | LIGHT YELLOW | LIGHT YELLOW | LIGHT YELLOW | LIGHT YELLOW |
| BOILING WATER RESISTANCE OF MOLDED PLATE (HOURS) | | 46 TO 56 | 48 TO 56 | 48 TO 56 | 48 TO 56 | 48 TO 56 |

[COMPARATIVE EXAMPLES 9 THROUGH 12]

The redox accelerator and various additives shown in Table 7 were added and mixed with the dicyclopentenyl-group-containing unsaturated polyester resin (III) obtained with the resin manufacture example 3 (shown as (III) in tables) in the compounding amounts shown in Table 7 so as to obtain the radical-setting-type thermosetting resin composition.

Table 8 shows results of measurements of gardener viscosities, drifts of gel time at room temperature (25° C.), hue of the cured product and boiling water resistance of the molded plate of the obtained radical-setting-type thermosetting resin composition.

TABLE 7

| RESIN | COMPARATIVE EXAMPLES | | | |
|---|---|---|---|---|
| | 9 (III) | 10 (III) | 11 (III) | 12 (III) |
| 8% COBALT OCTOATE (ppm) | 3000 | 3000 | 3000 | 3000 |
| DIMETHYL ANILINE (ppm) | 300 | 300 | 300 | 300 |
| TERT-BUTYLHYDROQUINONE (ppm) | 25 | — | 120 | 200 |
| PHENOTHIAZINE (ppm) | 100 | 500 | — | — |
| TRIETHYLBENZYL AMMONIUM BROMIDE (ppm) | — | — | 150 | 500 |

TABLE 8

|  |  | COMPARATIVE EXAMPLES | | | |
|---|---|---|---|---|---|
|  |  | 9 | 10 | 11 | 12 |
| RESIN VISCOSITY AND GEL TIME AT ROOM TEMPERATURE | IMMEDIATELY AFTER MANUFACTURE | | | | |
|  | GARDENER VISCOSITY (ST) | 4.5 | 4.5 | 4.5 | 14.5 |
|  | GEL TIME AT ROOM TEMPERATURE (MINUTES) STORED AT 50° C. FOR 1 MONTH | 26.4 | 56.5 | 26.6 | 26.5 |
|  | GARDENER VISCOSITY (ST) | GEL | 4.5 | GEL | GEL |
|  | GEL TIME AT ROOM TEMPERATURE (MINUTES) STORED AT 50° C. FOR 2 MONTHS | | >100 | | |
|  | GARDENER VISCOSITY (ST) | | 4.5 | | |
|  | GEL TIME AT ROOM TEMPERATURE (MINUTES) STORED AT 50° C. FOR 3 MONTHS | | >100 | | |
|  | GARDENER VISCOSITY (ST) | 4.5 | | | |
|  | GEL TIME AT ROOM TEMPERATURE (MINUTES) | >100 | | | |
| HUE OF CURED PRODUCT | | LIGHT YELLOW | BROWN | LIGHT YELLOW | GREENISH BROWN |
| BOILING WATER RESISTANCE OF MOLDED PLATE (HOURS) | | 48 TO 56 | 32 TO 40 | 48 TO 56 | 24 TO 32 |

[EMBODIMENTS 12 AND COMPARATIVE EXAMPLES 13 THROUGH 17]

The redox accelerator and various additives shown in Table 9 were added and mixed with the unsaturated polyester resin (IV) obtained with the resin manufacture example 4 (shown as (IV) in tables) in the compounding amounts shown in Table 9 so as to obtain the radical-setting-type thermosetting resin composition.

Table 10 shows results of measurements of gardener viscosities, drifts of gel time at room temperature (25° C.), hue of the cured product and boiling water resistance of the molded plate of the obtained radical-setting-type thermosetting resin composition.

TABLE 9

|  | EMBODIMENT | COMPARATIVE EXAMPLES | | | | |
|---|---|---|---|---|---|---|
|  | 12 | 13 | 14 | 15 | 16 | 17 |
| RESIN | (IV) | (IV) | (IV) | (IV) | (IV) | (IV) |
| 8% COBALT OCTOATE (ppm) | 3000 | 3000 | 3000 | 3000 | 3000 | 3000 |
| DIMETHYL ANILINE (ppm) | 300 | 300 | 300 | 300 | 300 | 300 |
| TERT-BUTYLHYDROQUINONE (ppm) | 55 | 15 | 85 | 175 | 90 | 50 |
| PHENOTHIAZINE (ppm) | 50 | 50 | — | — | — | — |
| TRIETHYLBENZYLAMMONIUM BROMIDE (ppm) | 50 | — | 50 | 500 | — | — |
| TRIPHENYL PHOSPHITE (ppm) | 50 | — | — | — | 50 | — |

TABLE 10

|  |  | EMBODIMENT | COMPARATIVE EXAMPLES | | | | |
|---|---|---|---|---|---|---|---|
|  |  | 12 | 13 | 14 | 15 | 16 | 17 |
| RESIN VISCOSITY AND GEL TIME AT ROOM | IMMEDIATELY AFTER MANUFACTURE | | | | | | |
|  | GARDENER VISCOSITY (ST) | 2.5 | 2.5 | 2.5 | 2.5 | 2.5 | 2.5 |
|  | GEL TIME AT ROOM TEMPERATURE (MINUTES) STORED AT 50° C. | 25.3 | 27.1 | 25.4 | 25.8 | 26.3 | 26.5 |

TABLE 10-continued

|  |  | EMBODIMENT | COMPARATIVE EXAMPLES | | | | |
|---|---|---|---|---|---|---|---|
|  |  | 12 | 13 | 14 | 15 | 16 | 17 |
| TEMPERA- | FOR 1 MONTH |  |  |  |  |  |  |
| TURE | GARDENER VISCOSITY (ST) | 2.5 | 2.5 | 3.2 | GEL | 2.5 | 2.6 |
|  | GEL TIME AT ROOM TEMPERATURE (MINUTES) STORED AT 50° C. FOR 2 MONTHS | 25.0 | 30.4 | 24.9 |  | 35.1 | 26.8 |
|  | GARDENER VISCOSITY (ST) | 2.5 | 2.5 | GEL |  | 2.5 | GEL |
|  | GEL TIME AT ROOM TEMPERATURE (MINUTES) STORED AT 50° C. FOR 3 MONTHS | 25.8 | 37.1 |  |  | 46.9 |  |
|  | GARDENER VISCOSITY (ST) | 2.5 | 2.6 |  |  | 2.5 |  |
|  | GEL TIME AT ROOM TEMPERATURE (MINUTES) | 25.5 | 48.0 |  |  | 66.3 |  |
| HUE OF CURED PRODUCT |  | LIGHT YELLOW | LIGHT YELLOW | LIGHT YELLOW | GREENISH BROWN | LIGHT YELLOW | LIGHT YELLOW |
| BOILING WATER RESISTANCE OF MOLDED PLATE (HOURS) |  | 40 TO 48 | 40 TO 48 | 40 TO 48 | 24 TO 32 | 40 TO 48 | 40 TO 48 |

[EMBODIMENTS 13 AND COMPARATIVE EXAMPLES 18 THROUGH 21]

The redox accelerator and various additives shown in Table 11 were added and mixed with the air-setting-type unsaturated polyester resin (V) obtained with the resin manufacture example 5 (shown as (V) in tables) in the compounding amounts shown in Table 11 so as to obtain the radical-setting-type thermosetting resin composition.

Table 12 shows results of measurements of gardener viscosities, drifts of gel time at room temperature (25° C.), hue of the cured product and boiling water resistance of the molded plate of the obtained radical-setting-type thermosetting resin composition.

TABLE 11

|  | EMBODIMENT | COMPARATIVE EXAMPLES | | | |
|---|---|---|---|---|---|
|  | 13 | 18 | 19 | 20 | 21 |
| RESIN | (V) | (V) | (V) | (V) | (V) |
| 8% COBALT OCTOATE (ppm) | 3000 | 3000 | 3000 | 3000 | 3000 |
| DIMETHYL ANILINE (ppm) | 300 | 300 | 300 | 300 | 300 |
| TERT-BUTYLHYDROQUINONE (ppm) | 80 | 70 | 95 | 80 | — |
| PHENOTHIAZINE (ppm) | 50 | 50 | — | 50 | 500 |
| TRIETHYLBENZYLAMMONIUM BROMIDE (ppm) | 100 | — | 100 | — | — |
| TRIPHENYL PHOSPHITE (ppm) | 100 | 100 | 100 | — | — |

TABLE 12

|  |  | EMBODIMENT | COMPARATIVE EXAMPLES | | | |
|---|---|---|---|---|---|---|
|  |  | 13 | 18 | 19 | 20 | 21 |
| RESIN VISCOSITY | IMMEDIATELY AFTER MANUFACTURE |  |  |  |  |  |
| AND GEL TIME AT ROOM TEMPERA- | GARDENER VISCOSITY (ST) | 3.4 | 3.4 | 3.4 | 3.4 | 3.4 |
|  | GEL TIME AT ROOM TEMPERATURE (MINUTES) STORED AT 50° C. FOR 1 MONTH | 24.3 | 23.5 | 25.2 | 24.3 | 47.0 |
| TURE | GARDENER VISCOSITY (ST) | 3.4 | 3.4 | GEL | GEL | 3.4 |
|  | GEL TIME AT ROOM | 25.1 | 45.8 |  |  | >100 |

TABLE 12-continued

|  | EMBODIMENT | COMPARATIVE EXAMPLES | | | |
|---|---|---|---|---|---|
|  | 13 | 18 | 19 | 20 | 21 |
| TEMPERATURE (MINUTES) STORED AT 50° C. FOR 2 MONTHS | | | | | |
| GARDENER VISCOSITY (ST) | 3.4 | GEL | | | 3.4 |
| GEL TIME AT ROOM TEMPERATURE (MINUTES) STORED AT 50° C. FOR 3 MONTHS | 25.7 | | | | >100 |
| GARDENER VISCOSITY (ST) | 3.4 | | | | 3.4 |
| GEL TIME AT ROOM TEMPERATURE (MINUTES) | 25.3 | | | | >100 |
| HUE OF CURED PRODUCT | LIGHT YELLOW | LIGHT YELLOW | LIGHT YELLOW | LIGHT YELLOW | BROWN |
| BOILING WATER RESISTANCE OF MOLDED PLATE (HOURS) | 64 TO 72 | 64 TO 72 | 64 TO 72 | 64 TO 72 | 32 TO 40 |

[COMPARATIVE EXAMPLES 22 THROUGH 26]

The redox accelerator and various additives shown in Table 13 were added and mixed with the air-setting-type unsaturated polyester resin (V) obtained with the resin manufacture example 5 (shown as (V) in tables) in the compounding amounts shown in Table 13 so as to obtain the radical-setting-type thermosetting resin composition.

Table 14 shows results of measurements of gardener viscosities, drifts of gel time at room temperature (25° C.), hue of the cured product and boiling water resistance of the molded plate of the obtained radical-setting-type thermosetting resin composition.

TABLE 13

|  | COMPARATIVE EXAMPLES | | | | |
|---|---|---|---|---|---|
|  | 22 | 23 | 24 | 25 | 26 |
| RESIN | (V) | (V) | (V) | (V) | (V) |
| 8% COBALT OCTOATE (ppm) | 3000 | 3000 | 3000 | 3000 | 3000 |
| DIMETHYL ANILINE (ppm) | 300 | 300 | 300 | 300 | 300 |
| TERT-BUTYLHYDROQUINONE (ppm) | 85 | 190 | 75 | 130 | 65 |
| PHENOTHIAZINE (ppm) | — | — | — | — | 13 |
| TRIETHYLBENZYL AMMONIUM BROMIDE (ppm) | 100 | 500 | — | — | — |
| TRIPHENYL PHOSPHITE (ppm) | — | — | 100 | 1000 | — |

TABLE 14

|  |  | COMPARATIVE EXAMPLES | | | | |
|---|---|---|---|---|---|---|
|  |  | 22 | 23 | 24 | 25 | 26 |
| RESIN VISCOSITY | IMMEDIATELY AFTER MANUFACTURE | | | | | |
| AND GEL TIME AT ROOM TEMPERA- | GARDENER VISCOSITY (ST) | 3.4 | 3.4 | 3.4 | 3.4 | 3.4 |
|  | GEL TIME AT ROOM TEMPERATURE (MINUTES) STORED AT 50° C. FOR 1 MONTH | 25.4 | 24.4 | 23.5 | 24.1 | 24.4 |
| TURE | GARDENER VISCOSITY (ST) | GEL | GEL | GEL | 3.4 | GEL |
|  | GEL TIME AT ROOM TEMPERATURE (MINUTES) STORED AT 50° C. FOR 2 MONTHS | | | | >100 | |
|  | GARDENER VISCOSITY (ST) | | | | 3.4 | |
|  | GEL TIME AT ROOM TEMPERATURE (MINUTES) STORED AT 50° C. | | | | >100 | |

TABLE 14-continued

|  | COMPARATIVE EXAMPLES | | | | |
| --- | --- | --- | --- | --- | --- |
|  | 22 | 23 | 24 | 25 | 26 |
| FOR 3 MONTHS |  |  |  | 3.4 |  |
| GARDENER VISCOSITY (ST) GEL TIME AT ROOM TEMPERATURE (MINUTES) |  |  |  | >100 |  |
| HUE OF CURED PRODUCT | LIGHT YELLOW | GREEN | LIGHT YELLOW | LIGHT YELLOW | LIGHT YELLOW |
| BOILING WATER RESISTANCE OF MOLDED PLATE (HOURS) | 64 TO 72 | 24 TO 32 | 64 TO 72 | 24 TO 32 | 64 TO 72 |

[EMBODIMENTS 14 THROUGH 18]

The redox accelerator and various additives shown in Table 15 were added and mixed with the dicyclopentenyl-group-containing unsaturated polyester resin (III) obtained with the resin manufacture example 3 (shown as (III) in tables) and the air-setting-type unsaturated polyester resin (VI) obtained with the resin manufacture example 6 (shown as (VI) in tables) in the compounding amounts shown in Table 15 so as to obtain the radical-setting-type thermosetting resin composition.

Table 16 shows results of measurements of gardener viscosities, drifts of gel time at room temperature (25° C.), hue of the cured product and boiling water resistance of the molded plate of the obtained radical-setting-type thermosetting resin composition.

TABLE 15

|  | EMBODIMENTS | | | | |
| --- | --- | --- | --- | --- | --- |
|  | 14 | 15 | 16 | 17 | 18 |
| RESIN | (VI) | (VI) | (VI) | (VI) | (III) |
| 8% COBALT OCTOATE (ppm) | 3000 | 3000 | 3000 | 3000 | 3000 |
| DIMETHYL ANILINE (ppm) | 300 | 300 | 300 | 300 | 300 |
| TERT-BUTYLHYDROQUINONE (ppm) | 45 | 60 | 50 | 70 | 90 |
| PHENOTHIAZINE (ppm) | 100 | 100 | 100 | 100 | 100 |
| TRIETHYLBENZYL AMMONIUM BROMIDE (ppm) | 150 | — | 150 | — | 150 |
| TRIETHYLBENZYL AMMONIUM CHLORIDE (ppm) | — | 150 | — | 150 | — |
| TRIPHENYL PHOSPHITE (ppm) | 200 | 200 | — | — | 150 |
| TRIBUTYL PHOSPHITE (ppm) | — | — | 200 | 200 | — |

TABLE 16

|  |  | EMBODIMENTS | | | | |
| --- | --- | --- | --- | --- | --- | --- |
|  |  | 14 | 15 | 16 | 17 | 18 |
| RESIN VISCOSITY | IMMEDIATELY AFTER MANUFACTURE |  |  |  |  |  |
| AND GEL TIME AT ROOM TEMPERA- TURE | GARDENER VISCOSITY (ST) | 4.0 | 4.0 | 4.0 | 4.0 | 4.5 |
|  | GEL TIME AT ROOM TEMPERATURE (MINUTES) | 26.1 | 24.4 | 25.1 | 24.9 | 25.0 |
|  | STORED AT 50° C. FOR 1 MONTH |  |  |  |  |  |
|  | GARDENER VISCOSITY (ST) | 4.0 | 4.0 | 4.0 | 4.0 | 4.5 |
|  | GEL TIME AT ROOM TEMPERATURE (MINUTES) | 25.9 | 25.0 | 25.0 | 25.3 | 25.3 |
|  | STORED AT 50° C. FOR 2 MONTHS |  |  |  |  |  |
|  | GARDENER VISCOSITY (ST) | 4.0 | 4.0 | 4.0 | 4.0 | 4.5 |
|  | GEL TIME AT ROOM TEMPERATURE (MINUTES) | 26.3 | 26.1 | 25.3 | 25.5 | 25.2 |
|  | STORED AT 50° C. FOR 3 MONTHS |  |  |  |  |  |
|  | GARDENER VISCOSITY (ST) | 4.0 | 4.0 | 4.0 | 4.0 | 4.5 |
|  | GEL TIME AT ROOM TEMPERATURE (MINUTES) | 26.3 | 26.0 | 25.5 | 26.1 | 25.5 |

TABLE 16-continued

|  | EMBODIMENTS | | | | |
| --- | --- | --- | --- | --- | --- |
|  | 14 | 15 | 16 | 17 | 18 |
| HUE OF CURED PRODUCT | LIGHT YELLOW | LIGHT YELLOW | LIGHT YELLOW | LIGHT YELLOW | LIGHT YELLOW |
| BOILING WATER RESISTANCE OF MOLDED PLATE (HOURS) | 40 TO 48 | 40 TO 48 | 40 TO 48 | 40 TO 48 | 48 TO 56 |

[EMBODIMENTS 19 AND 20 AND COMPARATIVE EXAMPLES 27 THROUGH 32]

The redox accelerator and various additives shown in Table 17 were added and mixed with the vinylester resin (VII) obtained with the resin manufacture example 7 (shown as (VII) in tables) and urethane(meth)acrylate resin (VIII) obtained with the resin manufacture example 8 (shown as (VIII) in tables) in the compounding amounts shown in Table 17 so as to obtain the radical-setting-type thermosetting resin composition.

Table 18 shows results of measurements of gardener viscosities, drifts of gel time at room temperature (25° C.), hue of the cured product and boiling water resistance of the molded plate of the obtained radical-setting-type thermosetting resin composition.

TABLE 17

|  | EMBODIMENT | COMPARATIVE EXAMPLES | | | EMBODIMENT | COMPARATIVE EXAMPLES | | |
| --- | --- | --- | --- | --- | --- | --- | --- | --- |
| RESIN | 19 (VII) | 27 (VII) | 28 (VII) | 29 (VII) | 20 (VIII) | 30 (VIII) | 31 (VIII) | 32 (VIII) |
| 8% COBALT OCTOATE (ppm) | 2000 | 2000 | 2000 | 2000 | 2000 | 2000 | 2000 | 2000 |
| DIMETHYL ANILINE (ppm) | 300 | 300 | 300 | 300 | 300 | 300 | 300 | 300 |
| TERT-BUTYLHYDROQUINONE (ppm) | 140 | 45 | 320 | 290 | 145 | 20 | 400 | 350 |
| PHENOTHIAZINE (ppm) | 200 | 200 | — | — | 300 | 300 | — | — |
| TRIETHYLBENZYL AMMONIUM BROMIDE (ppm) | 100 | — | 500 | — | 150 | — | 500 | — |
| TRIPHENYL PHOSPHATE (ppm) | 200 | — | — | 500 | 200 | — | — | 500 |

TABLE 18

|  |  | EMBODIMENT | COMPARATIVE EXAMPLES | | | EMBODIMENT | COMPARATIVE EXAMPLES | | |
| --- | --- | --- | --- | --- | --- | --- | --- | --- | --- |
|  |  | 19 | 27 | 28 | 29 | 20 | 30 | 31 | 32 |
| RESIN VISCOSITY AND GEL TIME AT ROOM TEMPERATURE | IMMEDIATELY AFTER MANUFACTURE GARDENER VISCOSITY (ST) | 3.6 | 3.6 | 3.6 | 3.6 | 3.0 | 3.0 | 3.0 | 3.0 |
|  | GEL TIME AT ROOM TEMPERATURE (MINUTES) | 24.9 | 25.1 | 27.1 | 24.8 | 26.5 | 25.8 | 26.3 | 24.5 |
|  | STORED AT 50° C. FOR 1 MONTH GARDENER VISCOSITY (ST) | 3.6 | GEL | GEL | GEL | 3.0 | GEL | GEL | GEL |
|  | GEL TIME AT ROOM TEMPERATURE (MINUTES) | 24.9 |  |  |  | 25.8 |  |  |  |
|  | STORED AT 50° C. FOR 2 MONTHS GARDENER VISCOSITY (ST) | 3.6 |  |  |  | 3.0 |  |  |  |
|  | GEL TIME AT ROOM TEMPERATURE (MINUTES) | 25.0 |  |  |  | 26.3 |  |  |  |
|  | STORED AT 50° C. FOR 3 MONTHS GARDENER VISCOSITY (ST) | 3.6 |  |  |  | 3.0 |  |  |  |
|  | GEL TIME AT ROOM TEMPERATURE (MINUTES) | 26.1 |  |  |  | 26.5 |  |  |  |
| HUE OF CURED PRODUCT |  | LIGHT GREEN | BROWN | GREEN | BROWN | BROWN | BROWN | BROWN | BROWN |
| BOILING WATER RESISTANCE OF MOLDED PLATE (HOURS) |  | 15 TO 20 | 15 TO 20 | 5 TO 10 | 10 TO 15 | 20 TO 25 | 20 TO 25 | 10 TO 15 | 15 TO 20 |

[EMBODIMENTS 21 AND COMPARATIVE EXAMPLES 33 AND 34]

The redox accelerator and various additives shown in Table 19 were added and mixed with the dicyclopentenyl-group-containing unsaturated polyester resin (I) obtained with the resin manufacture example 1 (shown as (I) in tables) in the compounding amounts shown in Table 19 so as to obtain the radical-setting-type thermosetting resin composition.

Table 20 shows results of measurements of the gel time at room temperature (25° C.), and results of experiments of anti-skinning stability at 60° C. and surface drying characteristic of the obtained radical-setting-type thermosetting resin composition.

TABLE 19

|  | EMBODIMENT | COMPARATIVE EXAMPLES | |
| --- | --- | --- | --- |
|  | 21 | 33 | 34 |
| RESIN | (I) | (I) | (I) |
| RATIO OF DICYCLOPENTENYL GROUP (PERCENTAGE BY WEIGHT) | 38 | 38 | 38 |
| 8% COBALT OCTOATE (ppm) | 3000 | 3000 | 3000 |
| DIMETHYL ANILINE (ppm) | 300 | 300 | 300 |
| TERT-BUTYLHYDROQUINONE (ppm) | 20 | 20 | 20 |
| PHENOTHIAZINE (ppm) | 100 | 300 | — |
| TRIETHYLBENZYLAMMONIUM CHLORIDE (ppm) | 100 | — | 300 |

TABLE 20

|  | EMBODIMENT | COMPARATIVE EXAMPLES | |
| --- | --- | --- | --- |
|  | 21 | 33 | 34 |
| GEL TIME AT ROOM TEMPERATURE IMMEDIATELY AFTER MANUFACTURE (MINUTES) | 14.0 | 45.0 | 13.8 |
| STORABLE TIME MEASURED WITH ANTI-SKINNING STABILITY AT 60° C. (DAYS) | 18 | 5 | 2 |
| SURFACE DRYING CHARACTERISTICS |  |  |  |
| DRYING TIME IMMEDIATELY AFTER MANUFACTURE (HOURS) | 2.0 | 6.0 | 2.0 |
| DRYING TIME AFTER STORED AT 50° C. FOR 3 MONTHS HOURS) | 2.0 | >24 | GEL |

[EMBODIMENTS 22 AND 23 AND COMPARATIVE EXAMPLES 35 THROUGH 38]

The redox accelerator and various additives shown in Table 21 were added and mixed with the dicyclopentenyl-group-containing unsaturated polyester resin (II) obtained with the resin manufacture example 2 (shown as (II) in tables) and the dicyclopentenyl-group-containing unsaturated polyester resin (III) obtained with the resin manufacture example 3 (shown as (III) in tables) in the compounding amounts shown in Table 21 so as to obtain the radical-setting-type thermosetting resin composition.

Table 22 shows results of measurements of the gel time at room temperature (25° C.), and results of experiments of anti-skinning stability at 60° C. and surface drying characteristic of the obtained radical-setting-type thermosetting resin composition.

TABLE 21

|  | EMBODIMENT | COMPARATIVE EXAMPLES | | EMBODIMENT | COMPARATIVE EXAMPLES | |
| --- | --- | --- | --- | --- | --- | --- |
|  | 22 | 35 | 36 | 23 | 37 | 38 |
| RATIO OF DICYCLOPENTENYL GROUP (PERCENTAGE BY WEIGHT) | 13 | 13 | 13 | 13 | 13 | 13 |
| 8% COBALT OCTOATE (ppm) | 3000 | 3000 | 3000 | 3000 | 3000 | 3000 |
| DIMETHYL ANILINE (ppm) | 300 | 300 | 300 | 300 | 300 | 300 |
| TERT-BUTYLHYDROQUINONE (ppm) | 80 | — | 180 | 90 | — | 200 |
| PHENOTHIAZINE (ppm) | 100 | 300 | — | 100 | 500 | — |
| TRIETHYLDENZYL AMMONIUM BROMIDE (ppm) | 100 | — | 500 | 150 | — | 500 |

TABLE 22

|  | EMBODIMENT | COMPARATIVE EXAMPLES | | EMBODIMENT | COMPARATIVE EXAMPLES | |
| --- | --- | --- | --- | --- | --- | --- |
|  | 22 | 35 | 36 | 23 | 37 | 38 |
| GEL TIME AT ROOM TEMPERATURE IMMEDIATELY AFTER MANUFACTURE (MINUTES) | 25.1 | 47.0 | 24.8 | 24.6 | 56.5 | 26.5 |
| STORABLE TIME MEASURED WITH ANTI-SKIMMING STABILITY AT 60° C. (DAYS) | >30 | 6 | 2 | >30 | 10 | 2 |
| SURFACE DRYING CHARACTERISTIC |  |  |  |  |  |  |

TABLE 22-continued

|  | EMBODI-MENT | COMPARATIVE EXAMPLES | | EMBODI-MENT | COMPARATIVE EXAMPLES | |
|---|---|---|---|---|---|---|
|  | 22 | 35 | 36 | 23 | 37 | 38 |
| DRYING TIME IMMEDIATELY AFTER MANUFACTURE (HOURS) | 3.2 | 7.6 | 2.7 | 2.9 | 11.0 | 3.3 |
| DRYING TIME AFTER STORED AT 50° C. FOR 3 MONTHS (HOURS) | 3.2 | >24 | GEL | 3.2 | >24 | GEL |

[EMBODIMENTS 24 THROUGH 26 AND COMPARATIVE EXAMPLES 39 THROUGH 43]

The redox accelerator and various additives shown in Table 23 were added and mixed with the dicyclopentenyl-group-containing unsaturated polyester resin (III) obtained with the resin manufacture example 3 (shown as (III) in tables), the air-setting-type unsaturated polyester resin (V) obtained with the resin manufacture example 5 (shown as (V) in tables) and the air-setting-type unsaturated polyester resin (VI) obtained with the resin manufacture example 6 (shown as (VI) in tables) in the compounding amounts shown in Table 23 so as to obtain the radical-setting-type thermosetting resin composition.

Table 24 shows results of measurements of the gel time at room temperature (25° C.), and results of experiments of anti-skinning stability at 60° C. and surface drying characteristic of the obtained radical-setting-type thermosetting resin composition.

As is clear from the results of the embodiments 1 through 20 shown in Tables 1 through 18, the resin composition in accordance with the present invention has good stability in viscosity, the well-suppressed drifts of gel time at room temperature, and, moreover, has good hue and boiling water resistance of the cured products.

Besides, from the results of the embodiments 21 through 26 shown in Tables 19 through 24, the resin composition in accordance with the present invention has good anti-skinning stability in the air and shows no decline in surface drying characteristic over a period of time due to storage.

Meanwhile, from the results of the comparative examples 1 through 43, it is evident that if any one of the polymerization inhibitors which are essential components of the resin composition in accordance with the present invention is not used, any mixture cannot produce resin composition which provides all the above characteristics.

As discussed above, the resin composition in accordance with the present invention has an effect of providing the

TABLE 23

|  | EMBODI-MENT | COMPARATIVE EXAMPLES | | EMBODI-MENT | COMPARATIVE EXAMPLES | | EMBODI-MENT | COMPARATIVE EXAMPLE |
|---|---|---|---|---|---|---|---|---|
|  | 24 | 39 | 40 | 25 | 41 | 42 | 26 | 43 |
| RESIN | (V) | (V) | (V) | (VI) | (VI) | (VI) | (III) | (III) |
| 8% COBALT OCTOATE (ppm) | 3000 | 3000 | 3000 | 3000 | 3000 | 3000 | 3000 | 3000 |
| DIMETHYL ANILINE (ppm) | 300 | 300 | 300 | 300 | 300 | 300 | 300 | 300 |
| TERT-BUTYLHYDROQUINONE (ppm) | 80 | — | 190 | 45 | — | 140 | 70 | 110 |
| PHENOTHIAZINE (ppm) | 50 | 500 | — | 100 | 500 | — | 100 | — |
| TRIETHYLBENZYL AMMONIUM BROMIDE (ppm) | 100 | — | 500 | 150 | — | — | 150 | — |
| TRIPHENYL PHOSPHITE (ppm) | 100 | — | — | 200 | — | 1000 | 150 | 1000 |

TABLE 24

|  |  | EMBODI-MENT | COMPARATIVE EXAMPLES | | EMBODI-MENT | COMPARATIVE EXAMPLES | | EMBODI-MENT | COMPARATIVE EXAMPLE |
|---|---|---|---|---|---|---|---|---|---|
|  |  | 24 | 39 | 40 | 25 | 41 | 42 | 26 | 43 |
| GEL TIME AT ROOM TEMPERATURE IMMEDIATELY AFTER MANUFACTURE (MINUTES) | | 24.3 | 47.0 | 24.4 | 26.1 | 50.0 | 35.0 | 30.0 | 26.0 |
| STORABLE TIME MEASURED WITH ANTI-SKINNING STABILITY AT 60° C. (DAYS) | | >30 | 11 | 4 | >30 | 9 | 4 | >30 | 10 |
| SURFACE DRYING CHARACTERISTIC | DRYING TIME IMMEDIATELY AFTER MANUFACTURE (HOURS) | 3.8 | 7.6 | 2.7 | 2.9 | 11.0 | 8.3 | 4.2 | 2.9 |
|  | DRYING TIME AFTER STORED AT 50° C. FOR 3 MONTHS (HOURS) | 4.1 | >24 | GEL | 3.0 | >24 | >24 | 4.2 | >24 | thermosetting resin composition which has good storage stability and little gel time drift, and, moreover, which produces a cured product of good surface drying, water resistance and hue.

Furthermore, as discussed above, the manufacturing method in accordance with the present invention has an effect of manufacturing the dicyclopentenyl-group-containing unsaturated polyester resin composition which has good storage stability and little gel time drift, and moreover, which produces a cured product having good surface drying, water resistance and hue.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. Resin composition, comprising:
a dicyclopentenyl-group-containing unsaturated polyester whose content ratio of dicyclopentenyl groups is not less than 20 percent by weight;
a cross-linking monomer; and
a curing accelerator,
wherein storable time measured with anti-skinning stability test at 60° C. is not shorter than 8 days, and gel time at room temperature measured for a mixture of 0.55 part by weight of the methylethylketone peroxide per 100 parts by weight of said resin composition is not longer than 60 minutes.

2. Resin composition, comprising:
a dicyclopentenyl-group-containing unsaturated polyester resin;
a phenothiazine (a); and
an anion producing compound (b).

3. The resin composition as defined in claim 2, wherein said dicyclopentenyl-group-containing unsaturated polyester resin is composed of:
a dicyclopentenyl-group-containing unsaturated polyester whose content ratio of dicyclopentenyl groups is not less than 20 percent by weight; and
a cross-linking monomer.

4. The resin composition as defined in claim 2,
wherein said anion producing compound (b) is at least one compound selected from the group consisting of ammonium salt, phosphonium salt, sulfonium salt and metal halide.

5. The resin composition as defined in claim 2,
wherein said anion producing compound (b) is a quaternary ammonium salt.

6. The resin composition as defined in claim 2,
wherein an amount of said phenothiazine (a) is in a range of 0.001 to 0.05 part by weight per 100 parts by weight of said dicyclopentenyl-group-containing unsaturated polyester resin.

7. The resin composition as defined in claim 2,
wherein an amount of said anion producing compound (b) is in a range of 0.002 to 0.1 part by weight per 100 parts by weight of said dicyclopentenyl-group-containing unsaturated polyester resin.

8. The resin composition as claimed in claim 2,
further comprising a phosphorous ester (c).

9. The resin composition as claimed in claim 2,
further comprising a curing accelerator.

10. The resin composition as claimed in claim 9,
wherein said curing accelerator is a metal compound containing at least one metal selected from the group consisting of cobalt, manganese, tin, vanadium, and copper.

11. Resin composition, comprising:
a thermosetting resin;
a phenothiazine (a);
an anion producing compound (b); and
a phosphorous ester (c).

12. The resin composition as defined in claim 11,
wherein said anion producing compound (b) is at least one compound selected from the group consisting of ammonium salt, phosphonium salt, sulfonium salt and metal halide.

13. The resin composition as defined in claim 11,
wherein said anion producing compound (b) is a quaternary ammonium salt.

14. The resin composition as defined in claim 11,
wherein an amount of said phenothiazine (a) is in a range of 0.001 to 0.05 part by weight per 100 parts by weight of said thermosetting resin.

15. The resin composition as defined in claim 11,
wherein an amount of said anion producing compound (b) is in a range of 0.002 to 0.1 part by weight per 100 parts by weight of said thermosetting resin.

16. The resin composition as defined in claim 11,
wherein an amount of said phosphorous ester (c) is in a range of 0.005 to 0.15 part by weight per 100 parts by weight of said thermosetting resin.

17. The resin composition as defined in claim 11,
wherein said thermosetting resin is an unsaturated polyester resin.

18. The resin composition as defined in claim 17,
wherein the unsaturated polyester resin is an air-setting-type unsaturated polyester.

19. The resin composition as defined in claim 11,
wherein said thermosetting resin is a vinylester resin.

20. The resin composition as defined in claim 11,
wherein said thermosetting resin is an urethane(meth) acylate resin.

21. A method of manufacturing resin composition, comprising the steps of:
(1) obtaining a dicyclopentenyl-group-containing unsaturated polyester by polycondensing unsaturated polyester material including a compound having a dicyclopentenyl group; and
(2) mixing a cross-linking monomer with the obtained dicyclopentenyl-group-containing unsaturated polyester,
wherein at least one of said steps selected from the group consisting of said step of polycondensing the unsaturated polyester material and said step of mixing the cross-linking monomer includes a step of adding a phenothiazine (a) and an anion producing compound (b).

22. The method of manufacturing the resin composition as defined in claim 21,
wherein said compound having a dicyclopentenyl group is an addition product of maleic acid to dicyclopentadiene.

* * * * *